(12) United States Patent
Jamkhedkar et al.

(10) Patent No.: US 11,785,415 B2
(45) Date of Patent: *Oct. 10, 2023

(54) LOCATIONS PLATFORM FOR MANAGING AND PROVIDING OF USER EXPERIENCES

(71) Applicant: PayPal, Inc., San Jose, CA (US)

(72) Inventors: Prashant Jamkhedkar, Fremont, CA (US); Anant Ganapathy, Cupertino, CA (US); Jie Leng, Palo Alto, CA (US); Biju Balakrishnan Nair, Pleasanton, CA (US); Haoyu Xue, San Jose, CA (US); Justin Warmkessel, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,420

(22) Filed: Jan. 31, 2022

(65) Prior Publication Data
US 2022/0159407 A1    May 19, 2022

Related U.S. Application Data

(63) Continuation of application No. 16/996,590, filed on Aug. 18, 2020, now Pat. No. 11,323,842, which is a
(Continued)

(51) Int. Cl.
*H04W 4/021*    (2018.01)
*H04L 67/52*    (2022.01)
(Continued)

(52) U.S. Cl.
CPC ............. *H04W 4/021* (2013.01); *H04L 67/52* (2022.05); *G06F 3/0484* (2013.01); *G06Q 20/18* (2013.01);
(Continued)

(58) Field of Classification Search
CPC ..... H04W 48/18; H04W 12/06; H04W 48/16; H04W 88/16; H04L 41/5051
See application file for complete search history.

(56) References Cited

U.S. PATENT DOCUMENTS 7,386,318 B2    6/2008    Moon et al.
7,936,736 B2    5/2011    Proctor, Jr. et al.
(Continued)

OTHER PUBLICATIONS

European Application No. 19796116.2, Extended European Search Report dated May 20, 2021, 8 pages.
(Continued)

*Primary Examiner* — Julio R Perez
(74) *Attorney, Agent, or Firm* — HAYNES AND BOONE, LLP

(57) ABSTRACT

A method for using location-based services for service management is discussed. The method includes receiving, at a server, a user request from a user device at a geographical location. The method includes accessing a store search to determine a store reference based on the user request and a user location corresponding to the geographical location, the store reference indicating tenant(s) accessible to the user via a user interface (UI) of the user device. The method includes accessing location data for the user device based on the store reference and a user account associated with the user, the location data indicating a service accessible via the UI and associated with a certain tenant. The method includes providing, to the user device and based on the location data, a user experience for accessing the service via the UI.

20 Claims, 7 Drawing Sheets

Related U.S. Application Data continuation of application No. 16/417,082, filed on May 20, 2019, now Pat. No. 10,750,315, which is a continuation of application No. 15/966,727, filed on Apr. 30, 2018, now Pat. No. 10,327,098.

(51) Int. Cl.
  *H04L 67/306* (2022.01)
  *G06Q 20/18* (2012.01)
  *G06F 3/0484* (2022.01)
  *G06Q 30/0601* (2023.01)
  *H04L 67/10* (2022.01)

(52) U.S. Cl.
  CPC .......... *G06Q 30/0641* (2013.01); *H04L 67/10* (2013.01); *H04L 67/306* (2013.01)

(56) References Cited

U.S. PATENT DOCUMENTS

| | | | |
|---|---|---|---|
| 8,942,996 B2* | 1/2015 | Argue | G06Q 20/3227 705/16 |
| 9,047,631 B2 | 6/2015 | Sridharan et al. | |
| 9,450,984 B2 | 9/2016 | Yu et al. | |
| 9,576,283 B2* | 2/2017 | Argue | G06Q 20/20 |
| 10,067,637 B2 | 9/2018 | Bozovich, Jr. | |
| 10,327,098 B1* | 6/2019 | Jamkhedkar | H04W 4/021 |
| 10,649,611 B2* | 5/2020 | Rauschenbach | G06F 3/0483 |
| 2002/0131393 A1 | 9/2002 | Baldridge | |
| 2004/0023666 A1* | 2/2004 | Moon | G06F 16/9537 455/427 |
| 2009/0325606 A1* | 12/2009 | Farris | H04L 67/51 455/456.3 |
| 2010/0023937 A1 | 1/2010 | Kothari et al. | |
| 2010/0061294 A1* | 3/2010 | Proctor, Jr. | G06Q 30/0282 370/328 |
| 2011/0213870 A1 | 9/2011 | Cai et al. | |
| 2012/0084177 A1* | 4/2012 | Tanaka | G06Q 30/0601 705/26.1 |
| 2012/0130823 A1 | 5/2012 | Levin | |
| 2012/0158482 A1 | 6/2012 | Paradise et al. | |
| 2013/0085881 A1* | 4/2013 | Chary | G06Q 30/02 705/26.1 |
| 2013/0198039 A1* | 8/2013 | Sridharan | G06Q 30/0613 705/26.44 |
| 2014/0074793 A1 | 3/2014 | Doering et al. | |
| 2014/0289850 A1 | 9/2014 | Yu et al. | |
| 2016/0057571 A1 | 2/2016 | Florins et al. | |
| 2016/0078416 A1* | 3/2016 | DeLuca | H04W 4/021 705/43 |
| 2016/0080341 A1 | 3/2016 | Jain | |
| 2018/0131703 A1* | 5/2018 | Harrison | H04L 63/083 |
| 2018/0276868 A1* | 9/2018 | Ohtsuka | G06F 40/109 |
| 2019/0347644 A1* | 11/2019 | Greenwald | G06K 19/06028 |
| 2020/0304626 A1* | 9/2020 | Phillips | G06Q 20/18 |
| 2021/0042724 A1* | 2/2021 | Rathod | G07G 1/0054 |
| 2021/0105575 A1* | 4/2021 | Jamkhedkar | G06Q 20/4014 |

OTHER PUBLICATIONS

International Appl. No. PCT/US2019/029749, International Preliminary Report on Patentability dated Nov. 12, 2020, 7 pages.
International Appl No. PCT/US2019/029749, International Search Report and Written Opinion dated May 23, 2019, 7 pages.
Wikipedia., "Database Index-Wikipedia", Sep. 4, 2012, XP055403176, Retrieved from the Internet URL: https://en.wikipedia.org/w/index.php?title=Database_index&oldid=510742315, [retrieved on Sep. 1, 2017], 6 pages.
Wikipedia., "Multitenancy-Wikipedia", Mar. 5, 2014, XP055633641, Retrieved from the Internet URL: https://en.wikipedia.org/w/index.php?title=Multitenancy&oldid=598245774, retrieved on (Oct. 18, 2019), 5 pages.

* cited by examiner

US 11,785,415 B2

LOCATIONS PLATFORM FOR MANAGING AND PROVIDING OF USER EXPERIENCES

CROSS-REFERENCE TO RELATED APPLICATIONS

This application is a continuation of U.S. patent application Ser. No. 16/996,590, filed Aug. 18, 2020, which is a continuation of U.S. patent application Ser. No. 16/417,082, filed May 20, 2019, now U.S. Pat. No. 10,750,315, which is a continuation of U.S. patent application Ser. No. 15/966,727, filed Apr. 30, 2018, now U.S. Pat. No. 10,327,098, issued Jun. 18, 2019, entitled "LOCATIONS PLATFORM FOR MANAGING AND PROVIDING OF USER EXPERIENCES", the disclosures of which are incorporated herein by reference in their entirety.

BACKGROUND

Embodiments of the present disclosure generally relate to the field of communication systems and, more particularly, to managing how user experiences are managed and communicated to user devices.

User devices are used to provide user experiencers to users for various scenarios. For example, a user device can provide, via its graphical user interface (GUI), a certain on-line or in-store shopping experience to the user. For example, the user device can provide, via a dedicated mobile application, a certain shopping GUI for the user, to access various services and/or products that are offered by a merchant associated with the dedicated mobile application. Similarly, a dedicated shopping experience can be provided to the user via a web browser that accesses a dedicated web page that is associated with the merchant. However, the use of dedicated mobile applications and/or dedicated websites can be very resource intensive on a solution provider.

For example, a solution provider may need to develop separate dedicated mobile applications and/or separate dedicated web pages for each of multiple merchants and/or service providers. The development, testing, and/or communication with the plurality of dedicated mobile applications and/or service providers can be a resource-intensive burden on the solution provider. Furthermore, the installation and/or use of these many dedicated mobile applications and/or service providers can impose memory and/or processing resource issues on the user devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
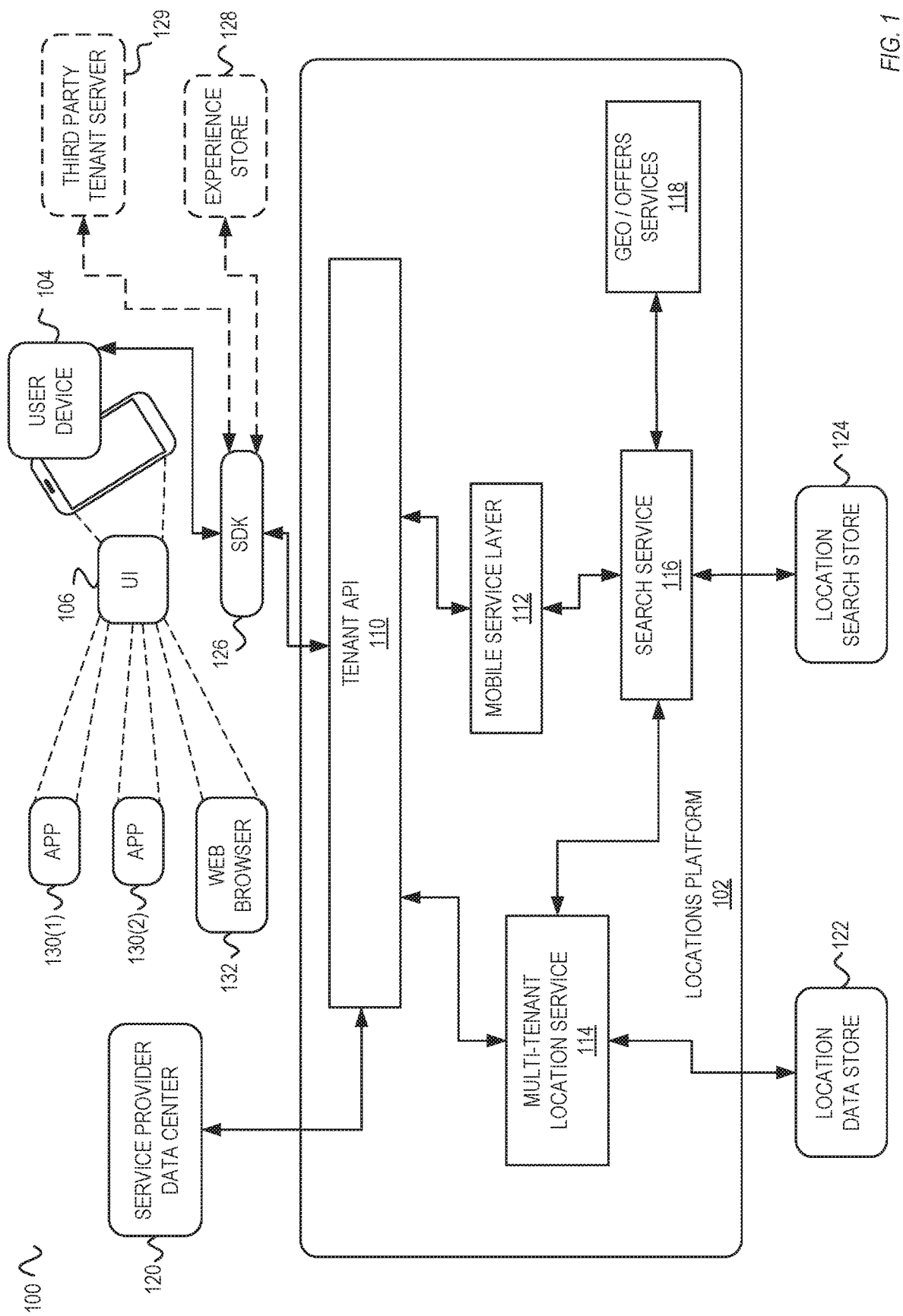
FIG. 1 is a system diagram illustrating embodiments of a communication system showing a locations platform communicating with a user device.

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

A solution provider can provide various services to users of user devices. The services can include various merchant services, such as in-store check-out via the user device, access to online store, order-ahead at a certain store, a cash-in process (e.g., at an Automated Teller Machine (ATM)), a cash-out process (e.g., at an ATM), self-checkout for fuel at pay-at-the-pump stations, among others. In some embodiments, the solution provider can provide funds in/funds out services (e.g., including the cash-in, cash-out, checkout services) from a payment system to the users. As noted, the services can include SaaS and Platform as a Service (PaaS) services and/or other cloud services that are accessible by the user device. For example, the solution provider can provide access, to the user device, to various software applications, or deliver such software to the user device.

The solution provider can provide access to, and/or provide actual services (e.g., when using SaaS) to the user device via dedicated mobile applications and/or separate dedicated web pages accessible at the user device. Thus, the solution provider may need to develop separate dedicated mobile applications and/or separate dedicated web pages corresponding to each of the services noted above. However, such development and/or testing of such dedicated mobile applications/dedicated web pages can be a resource-intensive burden on the solution provider. Furthermore, a communication of these dedicated apps is a resource-intensive proposition for the solution provider, as well as the user device itself (e.g., memory and/or processing resource issues).

Thus, the solution provider can utilize a unified locations platform that stores information of merchant location data across many locations. The unified locations platform can onboard new tenants as needed by using a location data model. The unified locations platform can process user requests and determine the appropriate tenant location and associated service for each user request, based on the location data. The unified locations platform can configure GUIs of user applications based on a user experience corresponding the determined service for a given tenant. The unified locations platform can thus expose appropriate user experiences for a user application based on the location data, without needing dedicated mobile applications and/or separate dedicated web pages.

In some embodiments, the solution provider can implement methods and/or systems for using location-based services for service management. The solution provider can receive a user request from a user device, where the user request can indicate a geographical location. The solution provider can use a store search to determine a store reference based on the user request and a user location corresponding to the geographical location. The store reference can indicate one or more tenants that are accessible via a user interface (UI) of the user device. The solution provider can access location data for the user device based on the store reference and a user account associated with the user. The location data can indicate a service that is accessible at the user device (e.g., via the UI) and that is associated with a first tenant of the tenants. The solution provider can then provide, based on the location data, a user experience to the to the user device, where the experience environment facilitates access to the service via the UI.

In some embodiments, the solution provider can on-board service providers. The solution provider can receive service provider information that identifies the new service provider. The solution provider can then create a new data element corresponding to locations of one or more tenants of the new service provider. The solution provider can resolve service provider information including user experiences provided by the new service provider. The solution provider can then create and store two variations of location data corresponding to the new service provider, a write-optimized location data and a read-optimized location data. The solution provider can access the read-optimized location data when providing user experience(s) to the user devices. The following description and associated Figures illustrate various embodiments directed to the ideas listed above.

FIG. 1 is a system diagram illustrating embodiments of a communication system showing a locations platform communicating with a user device. In an overview of the system diagram 100, a locations platform 102 can receive user requests from the user device 104. The locations platform 102 can implement the solution provider functionality discussed above. However, in other embodiments, the solution provider functionality can be implemented using a different platform. The locations platform 102 can determine, based on the user request, a certain experience to provide to the user device 104. The locations platform 102 includes a tenant API 110, a mobile service layer 112, a multi-tenant location service 114, a search service 116, and geo/offers services 118.

The user device 104 can be any type of a computing device that can communicate user requests to the locations platform 102. As further discussed below with reference to FIG. 8, the user device 104 can be implemented as a kiosk, a point-of-sale (PoS) terminal, a mobile device, among others. The user device 104 includes a user interface (UI) 106 through which the user can interact with displayed user experiences. The user device 104 can generate and communicate the user request to the mobile service layer 112, which can determine location data for the user request. The user request can be based on a geographical location of the user device 104, on a type of access indicated by the user, a type of application 130(1)-130(2) or the web browser 132 from the user request is made, a history of service usage for the used, among other factors. The mobile service layer 112 can then return location data for the user request. The location data can then be used by the SDK 126 to determine the appropriate user experience.

The user device 104 can interface with the SDK 126, a portion of which can be hosted by the user device 104. In some embodiments, the SDK 126 can provide user experiences to one of applications 130(1)-130(2). In other embodiments, the SDK 126 can provide user experiences to a web browser (132) hosted by the user device. The applications (also referred to as "apps") 130(1) and 130(2) and the web browser 132 can then display the user experience to the user of the user device) via the UI 106.

The tenant API 110 interfaces with various other components of the locations platform 102 and also with components of the user device 104. The locations platform 102 communicates, via the tenant API 110, with a service provider data center 120. The service provider data center 120 can provide information related to tenants, associated services, and/or associated user experiences, to the multi-tenant location service 114 via the tenant API 110. For example, as discussed in more detail with reference to FIG. 5, a new tenant is on-boarded by the multi-tenant location service 114, which can store a write optimized location data. Information on the new on-boarded tenant can be stored by the search service 116, as a read optimized location data. The tenant API 110 provides a uniform interface through which references to selected tenants and/or associated user experiences are accessed and provided to the user device 104 components. In other words, the locations platform can manage a plurality of tenants, each one of which can be associated with one or more services, which are exposed to the user device 104.

The locations platform 102 also communicates, via the tenant API 110, with the SDK 126. The SDK 126 (as further discussed with reference to FIG. 2), can obtain the location data from the tenant API, and provide a user experience to the UI 106 of the user device 104. In some embodiments, the SDK 126 can obtain the experience from an experience store 128, which can store various experiences using various techniques. The user experience can be provided as an experience reference that is activated at one of the applications 130(1)-130(2). The user experience can be provided as a web experience reference that is provided to the web browser 132, e.g., as directed by a web page provided to the web browser 132 from an external server (not shown).

Each of the applications 130(1) and 130(2) can be a different type of an application. In some embodiments, the application 130(1) can be a consumer application having functionality that is configured based on the user experience that is received from the SDK 126. The application 130(2) can be a white-label application, functionality of which can be provided by a third party tenant and integrated with systems of the third party tenant. The white-label application can thus communicate and integrate with a separate third party tenant server 129 of the third party tenant. For example, whereas consumer application functionality of application 130(1) integrates via the SDK 126 with a user experience provided by the experience store 128, the white-label functionality of the application 130(2) can be provided by the separate third party tenant server 129.

The application 130(1) can be configured, via a certain user experience, to allow the user to access, via the UI 106, the appropriate service of the tenant. For example, the provided experience can configure the app 130(1) to allow a check-in at a physical tenant location, and then display an on-line store and/or a mobile Point-of-Sale functionality that is customized for the physical tenant location. The same application 130(1) can then be reconfigured, via another user experience, to perform another service for another tenant. For example, the another user experience can reconfigure the application 130(1) for performing a cash-out functionality. The SDK 126 can provide one of a variety of user experiences accessible via the same user account. In other words, the user could access the services of any of the applications 130(1) or 130(2) (or, in some embodiments, of the web browser 132) using pre-authenticated access to the user account.

In one embodiment, the another user experience can switch context on the user device 104 from the application 130(1) to application 130(2). For example, regardless of origination of the user request on the user device 104, if the location data is associated with a tenant and/or service that is only accessible via the application 130(2) and not 130(1), then the another user experience can cause the user device 104 to context switch between these applications. Similarly, if the location data is associated with a tenant and/or service that is only accessible via the web browser 132 and not either one of the applications 130(1) or 130(2), then the respective user experience would cause the user device 104 to context switch to the web browser 132.

The mobile service layer 112 is for handling user requests received from the user device 104. For example, the user request can be for listing of any services in a certain type of category at a certain geographical location (e.g., such as a location of the user device 104, or at a destination location indicated by a mapping function of the user device 104).

The multi-tenant location service 114 is for onboarding new tenants and associated services. A new tenant is on-boarded onto the location data store 122 using a write-optimized location data generated based on service provider information provided from the service provider data center 120. The locations platform 102 also communicates, via the multi-tenant location service 114, with a location data store 122.

The search service 116 is for performing tenant and service searches using read-optimized location search store 124. The user request received from the user device 104 is used to access the location search store 124 to obtain read-optimized location data. In some embodiments, the search service 116 can generate, based on the user request (and optionally on information related to the user device) a text-based query for accessing the location search store 124. The search service 116 interfaces with the geo and offers services 118 to obtain additional services and/or special offers on one or more services, offered by a tenant indicted by the read-optimized location data. The search service 116 can also on-board the new tenant by generating read-optimized location data based on corresponding write-optimized location data obtained from the multi-tenant location service 114.

Depending on the implementation, the location search store 124 can be configured to provide responses to queries in a variety of formats. The location search store 124 can be implemented using a relational database accessible by Structured Query Language (SQL) commands. In some embodiments, the location search store 124 can be implemented as a key-value database, such as using REDIS technology, that can be accessible via a variety of text-based queries. In some embodiments, the location search store 124 can be implemented using semi-structured data that can be accessible via JavaScript Object Notation (JSON) or related commands. In some embodiments, the location search store 124 can be implemented using a server accessible via GraphQL interface. The location data store 122 can be similarly implemented, and accessible via the multi-tenant location service 114.

In one embodiment, a payment system (not shown) can process a payment and order fulfilment for services provided via the user experiences. The payment system can perform risk analysis on the services to determine whether or not to perform the service and/or process a payment for the service.

In some embodiments, the payment system can perform risk and/or verification services for new tenants that are being on-boarded by the locations platform 102. The payment system can process payments from the user account that is associated with the user device 104. The payment system can provide financial services, such as a fund transfer (e.g., a transfer of a certain monetary amount), to the user. The payment system can include payment accounts, each of which can be associated with a buyer or a seller. For example, a buyer (e.g., a user of the user device 104) can be associated with one payment account, and the seller (e.g., one of the tenants) can be associated with another payment account at the payment system. Upon successfully performing the risk analysis on the requested service (e.g., a requested transaction at the tenant), the payment system can then perform a fund transfer from the buyer's payment account to the seller's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out services, as determined based on the location data, from the payment system to the users of the user devices.

For simplicity, FIG. 1 only shows a user device 104 and two separate applications 130(1) and 130(2). However, as discussed herein, the locations platform 102 can interface with multiple user devices 104, and thus provide user experiences to many different users. Similarly, each of the user devices (such as the user device 104) can host multiple applications, which are then appropriately accessed by the SDK 126 when providing user experiences.

Figure 2:
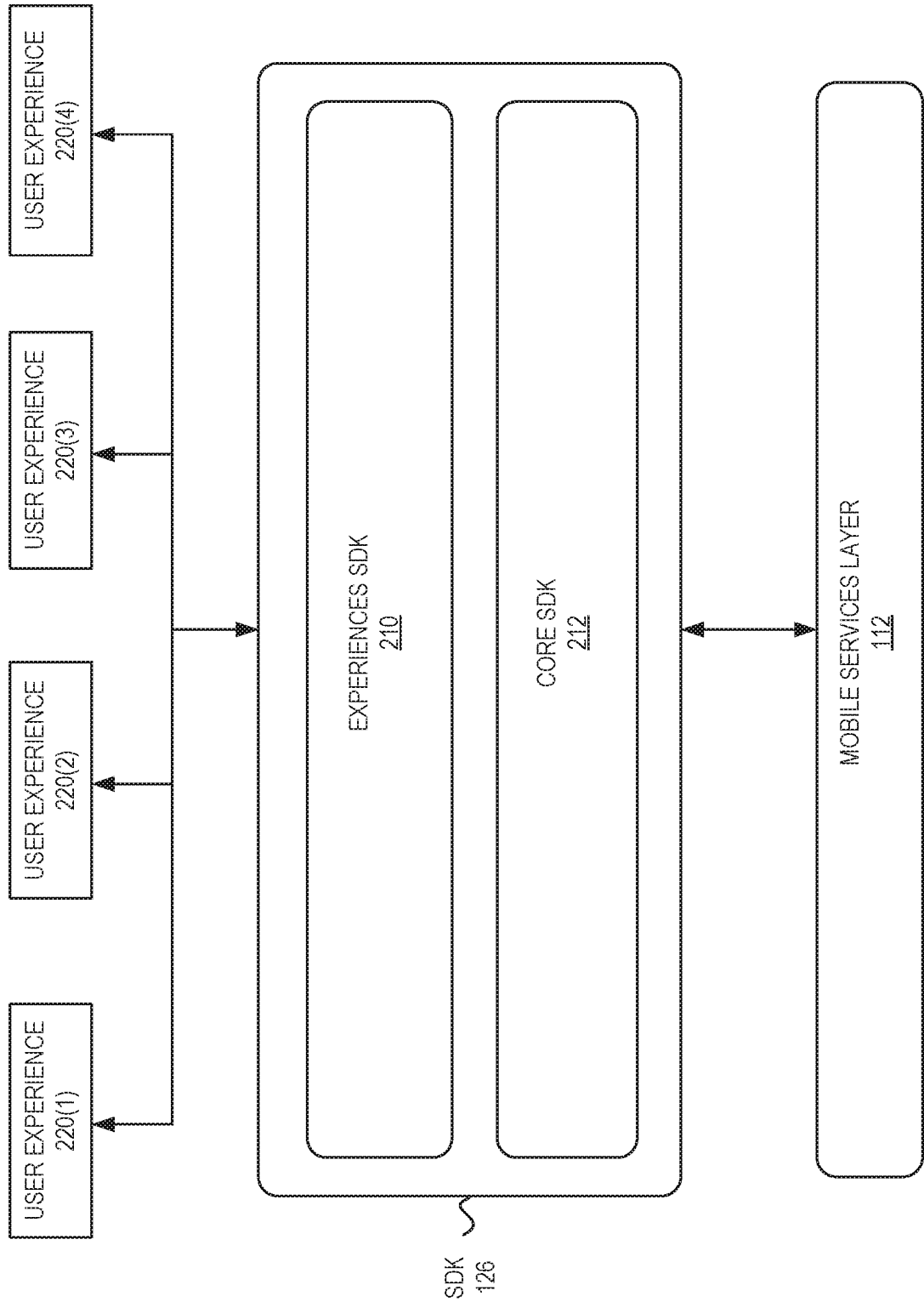
FIG. 2 is a system diagram illustrating embodiments of communication between SDK and mobile service layers of FIG. 1 to provide various experiences to the user device.

FIG. 2 is a system diagram illustrating embodiments of communication between SDK and mobile service layers of FIG. 1 to provide various experiences to the user device. FIG. 2 shows embodiments of how the SDK 126 is used to support multi-tenancy aspects of the locations platform 102, and customizable user experiences (e.g., experiences 220(1)-220(4)) that are provided to the user device. It is noted that, similar to that of FIG. 1, the modules shown in FIG. 1 illustrate logical division and/or flow, instead of actual physical placement of modules. The SDK 126 includes an experiences SDK 210 and a core SDK 212.

The SDK 126 communicates with the mobile services layer 112 (which itself communicates with the search service 116 as discussed above) to search for location data based on a user request received from a user device 104. In some embodiments, the core SDK 212 portion can communicate with the mobile service layer 112 to provide various additional search capabilities for the user request. The additional search capabilities include distance (e.g., by radius from the user locations), keyword, and/or physical address, among others. The core SDK 212 can also provide filtering capabilities on which the user can filter any search results received from the mobile services layer 112.

The experiences SDK 210 also facilitates how the search results are presented in the UI 106 for user selection. For example, the search results can indicate that at the user's location, there are several tenants, each offering a different service. The locations platform 102 allows to configure the same location for multiple tenants and/or the same location for the same tenant but different offers (as obtained from the geo/offers services 118). Upon receiving user selection, the experiences SDK 210 can communicate the selection back to the mobile services layer (e.g., via the core SDK 212). Once the location data is received, the experiences SDK 210 can determine the appropriate user experience (and optionally the appropriate application) to present to the user device. The experiences SDK 210 can also communicate with the experience store 128 to obtain the appropriate user experience and/or to obtain parameters to configure a dynamic user experience based on results of the tenant store search (that is performed for the received user request). The experiences SDK 210 facilitates configuration of the user experiences 220(1)-220(4) based on the location data. As discussed below with reference to FIG. 3, the locations data model facilitates the configuration of the user experiences.

Figure 3:
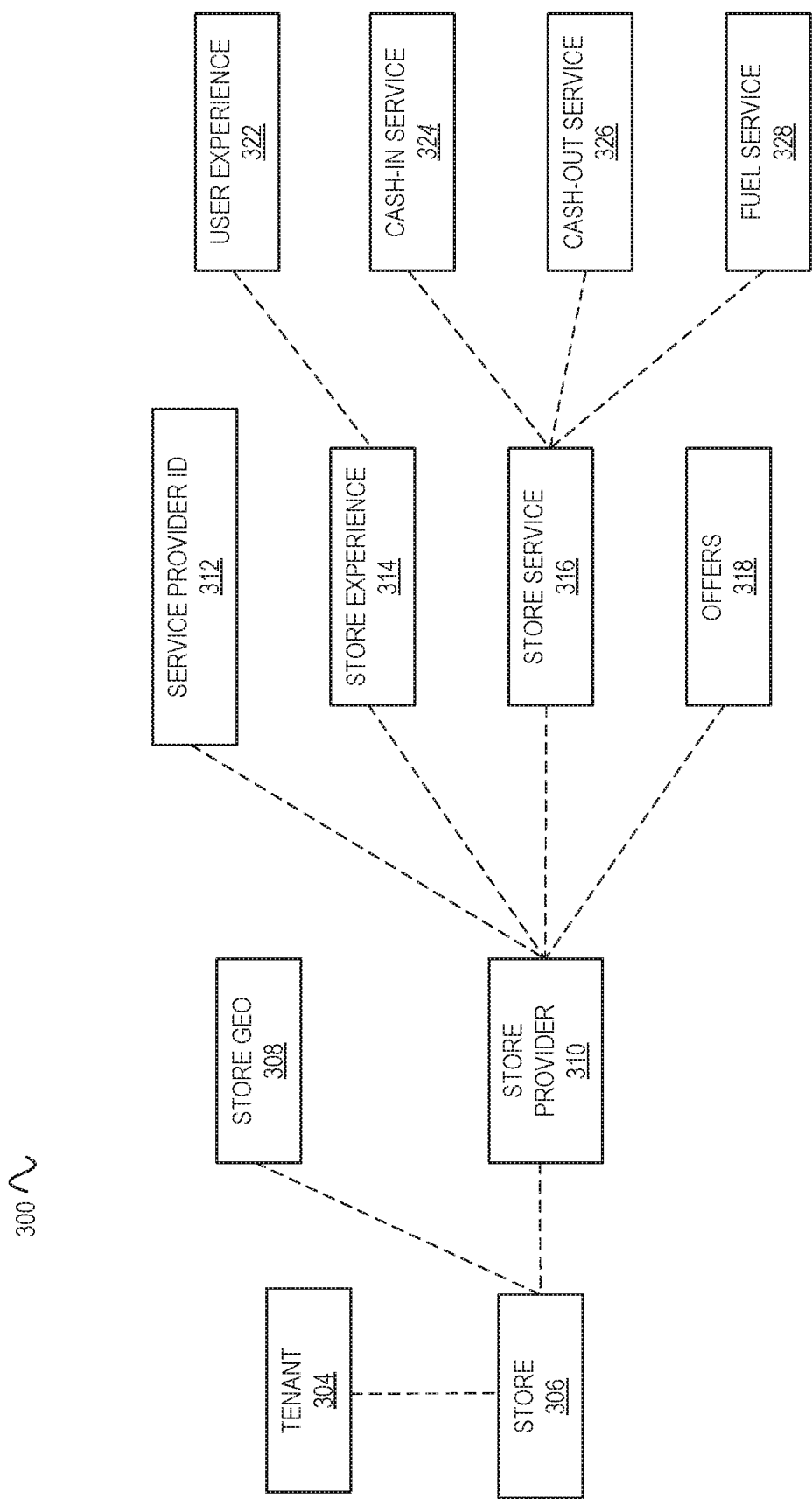
FIG. 3 is a system diagram illustrating embodiments of organization of various data structures used by the location platform to provide various experiences to the user device.

FIG. 3 is a system diagram illustrating embodiments of organization of various data structures used by the location platform to provide various experiences to the user device. FIG. 3 illustrates an example location data 300 that is optimized for write operations, e.g., as write-optimized location data 300 for storing and access at the locations data store 122 via the multi-tenant location service 114. The write-optimized location data 300 is structured for efficient on-boarding of new tenants, their associated services, and user experiences. Furthermore, the write-optimized location data 300 shown in FIG. 3 is just one instance for a certain tenant that has been on-boarded onto the locations platform 102. It is noted that each instance can include additional or fewer number of elements, e.g., the number and/or type of services (shown as elements 324-328) can be different for each instance of the write-optimized location data 300.

The write-optimized location data 300 also allows for access by tenant. Thus, the tenant (e.g., a server operated by the tenant) can access and modify one or more elements of the write-optimized location data 300, such as a user experience 322. The write-optimized location data 300 can be accessible by tenants via the tenant API 110 and the multi-tenant location service 114. For example, the write-optimized location data 300 can be accessible via a tenant experience, such as via an UI displayed at a tenant server. In some embodiments, the write-optimized location data 300 can also be accessed by the payment system for authentication and synchronization of transactions between entities at the payment system, as well for serving single-source of truth functionality.

As shown, the write-optimized location data 300 includes various elements 304-328. However, the write-optimized location data 300 can include fewer or additional elements, as desired. The write-optimized location data 300 includes a tenant element 304, a store element 306, a store geo element 308, and store provider element 310, a service provider ID 312, offers element 318, user experience element 322, cash-in service element 324, cash-out service element 326, and fuel service element 328, among others. The tenant element 304 can indicate a general type of a tenant, and is associated with the store element 306. The store element 306 can indicate a name and/or attributed of an actual physical store, and can be associated with the store geo element 308. The store geo element 308 can indicate an address and/or geographical coordinates of the actual physical store.

The store element 306 can also be associated with a store provider element 310 that can further indicate additional details about how the technical elements and experiences can be provided to the SDK 126, and thus to the user device 104. The store provider element 310 can be associated with the service provider ID 312, which can simply indicate a reference number by which the technical elements and experiences can be found and accessed. The store service element 316 indicates various attributes that can be utilized when configuring the user experience. The offers element 318 indicates various offers and promotions (that are searchable and found to be associated with the selected user experience at the determined tenant. In the example shows in FIG. 3, the store service element 316 is associated with three separate user experience elements 324-328, i.e., the cash-in service 324, the cash-out service 326, and the fuel service element 328. However, each instance of the write-optimized location data 300 can have fewer or additional services, depending on the on-boarding and any attributes of the store service element 316 that can activate/deactivate certain services.

A read-optimized location data (not shown) is a shorter and/or a faster accessible (at the location search store 124 via the search service 116) version of the write-optimized location data 300. For example, the read-optimized location data can include a flat structure that is indexed and thus faster to access for reads (such as in response to user requests). The read-optimized location data also does not need to include all of the data elements of the write-optimized location data 300.

Upon receiving a user request, the read-optimized version of the write-optimized location data 300 is accessed. The store experience 314 can indicate how the user experience element 322 can be dynamically configured. In some embodiments, the user experience element 322 is only generated for the read-optimized location data based on the user request. In some embodiments, a modified version of the user experience element 322 (e.g., modified responsive to receiving instructions from the tenant) can be reconciled to a corresponding read-optimized version, and then accessed in response to the user request.

Figure 4:
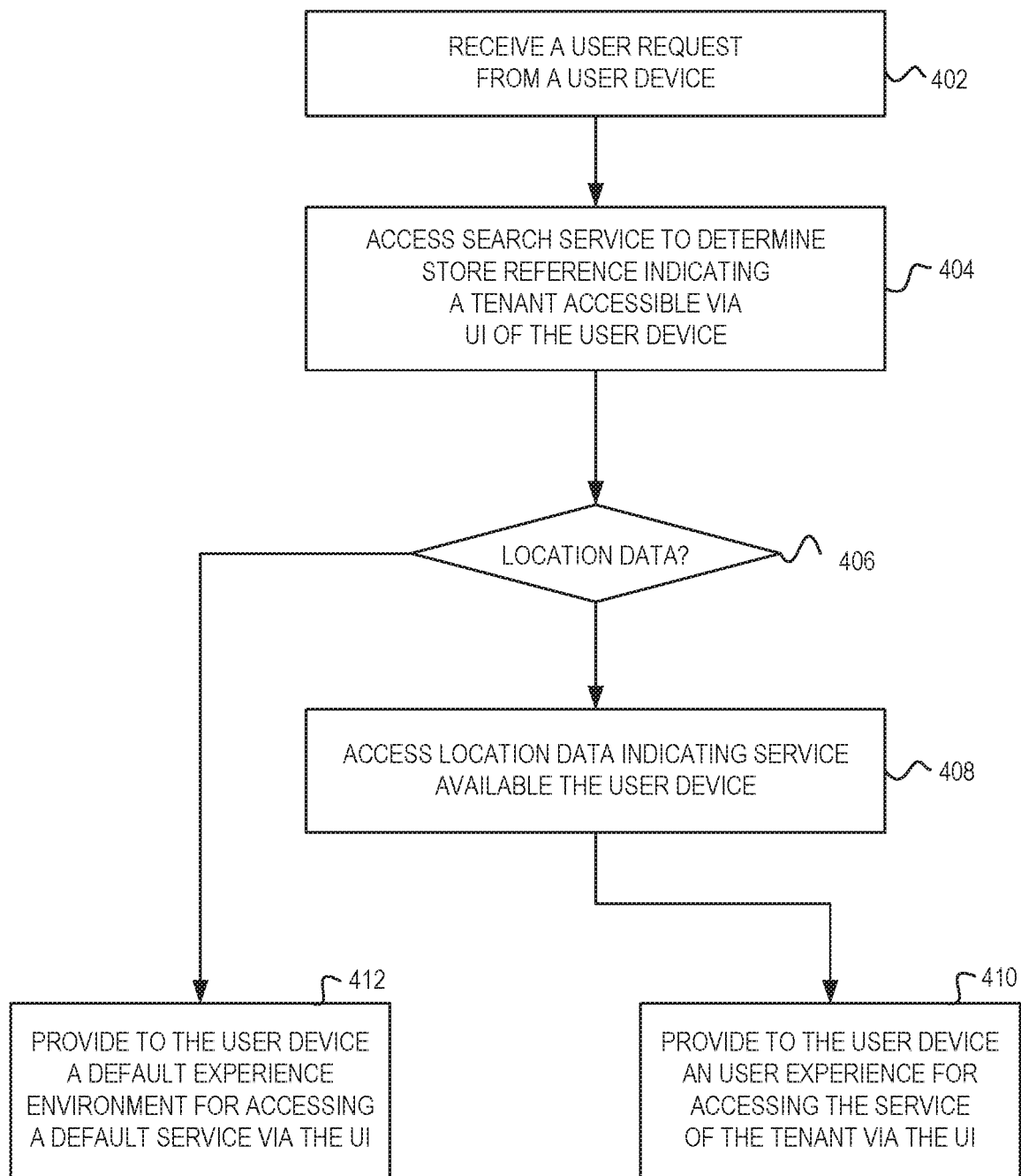
FIG. 4 is a flow diagram illustrating embodiments of operations for providing user experiences to the user device by the locations platform.

FIG. 4 is a flow diagram illustrating embodiments of operations for providing user experiences to the user device by the locations platform. The method of FIG. 4 is described with reference to the systems and components described in FIGS. 1-3 (for illustration purposes and not as a limitation). The example operations can be carried out by the locations platform 102. In some embodiments, at least a portion of one or more of elements 402-412 can be performed by the SDK 126.

Beginning with 402, the locations platform 102 receives a user request from a user device 104. In some embodiments, the user request can indicate a desired service and a location of the user device. The user request can indicate various characteristics of the user device. The user request can indicate In cases where the service is an SaaS service, the user device location may not be provided. In some embodiments, the user request can indicate a user account that is associated with the user of the user device. In some embodiments, the user request can be propagated to the locations platform 102 via the SDK 126.

At 404, the mobile service layer 112 accesses the search service 116 to determine a store reference indicating a tenant that is accessible via the UI 106 of the user device 104. The mobile service layer 112 can access the search service 116 using the information received via the user request and/or other information that the mobile service layer 112 may store on the user and/or the user device 104. The mobile service layer 112 can determine a request type of the user request. The request type can indicate a type of service requested by the user, which can include a type of SaaS service. The request type can indicate a cash-in service type, an on-line service type, a fuel service, among others.

At 406, the mobile service layer 112 determines whether the location search store 124 stores (or otherwise indicates)

location data that corresponds to the user requests. The mobile service layer 112 can determine the correspondence if there is a tenant that offers the requested service, and optionally if a physical location of the tenant is in a certain vicinity (e.g., as determined via a distance threshold) of the user device. If the mobile service layer 112 determines that the elastic search stores (or otherwise indicates) location data, element 410 is performed next. Otherwise, if the mobile service layer 112 determines that the location search store 124 does not store (or otherwise indicate) location data, element 412 is performed.

At 408, the mobile service layer 112 accesses location data indicating service available for the user device. The mobile service layer 112 can access the location data based on search results from the search service 116. In some embodiments, the mobile services layer 112 can determine a certain tenant from a plurality of tenants that are available at a geographical location indicated by the user request.

In some embodiments, the mobile service layer 112 can determine a user account that is associated with the user of the user device, where the user account can be an account at the location platform (and/or at the payment system). The user account can be an account at the tenant associated with the service. The SDK 126 can then associate the user account with the user experience of the tenant for accessing the service. In some embodiments, the SDK 126 can also process a check-in request from the user device for associating the user device with a physical location of the tenant. The mobile service layer 112 can then access the location data further based on the check-in.

At 410, the locations platform 102 provides to the user device 104 a user experience for accessing the service of the tenant via the UI. The user experience can be provided as an experience reference that activates the selected user experience at the application 130(1) or 130(2). The user experience can be provided as a new portion of the application 130(1) or 130(2) that is then executed at the user device 104. The user experience can be provided as a new webpage to the web browser 132. The user experience can be provided with enabled access to the user account at the tenant or at the locations platform that on-boarded the tenant.

At 412, the locations platform 102 provides to the user device 104 a default experience environment for accessing a default service via the UI. The default service can simply allow the user to attempt to select another service, via another user request.

Figure 5:
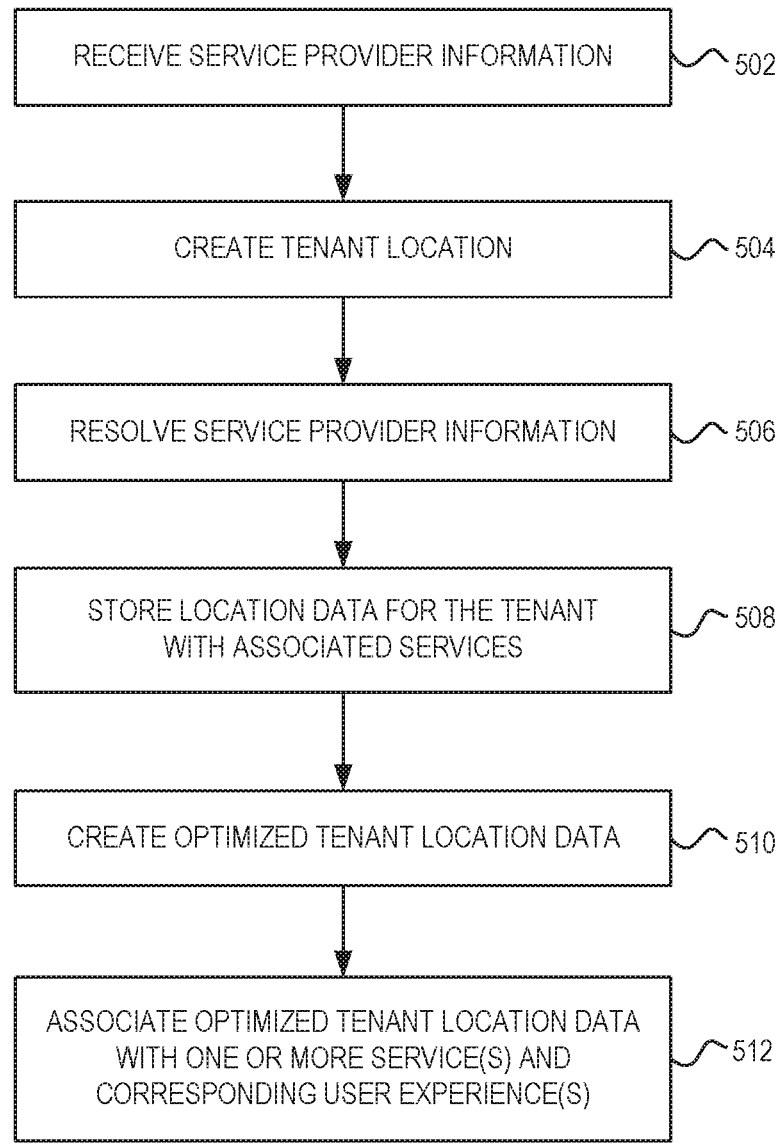
FIG. 5 is a flow diagram illustrating embodiments of operations for on-boarding a new tenant by the locations platform.

FIG. 5 is a flow diagram illustrating embodiments of operations for on-boarding a new tenant by the locations platform. The method of FIG. 5 is described with reference to the systems and components described in FIGS. 1-3 (for illustration purposes and not as a limitation). The example operations can be carried out by the locations platform 102 prior to searching for, and accessing the new tenant, as discussed at FIG. 4.

Beginning with 502, the locations platform 102 receives service provider information. The service provider information can be received by the multi-tenant location service 114 from the service provider data center 120. The service provider information can include one or more of service(s) offered by the tenant, a type of tenant, whether the tenant includes a separate check-in service, and/or user experience (s) offered by the tenant, among others.

At 504, the locations platform 102 creates a tenant location element. The multi-tenant location service 114 can create the new tenant location element for use at the location data store 122. In one embodiment, the tenant location element can be implemented using the location data 300 discussed above with reference to FIG. 3.

At 506, the locations platform 102 resolves service provider information. The multi-tenant location service 114 can determine tenant profile, perform risk and other verification services (e.g., such as by communicating with a payment system) for the new tenant, can determine whether the new tenant is a new location instance of an existing merchant (e.g., a new physical store location or a new online store front for the existing merchant). The multi-tenant location service 114 can also determine whether the services and/or user experiences for the new tenant are supplied with the service provider information. Thus, the multi-tenant location service 114 can verify accuracy of the data in the location data (e.g., the location data 300) for the new tenant.

At 508, the locations platform 102 stores location data for the tenant with associated services. The multi-tenant location service 114 can store the new tenant location element at the location data store 122, which is write-optimized for on-boarding and modification by tenants. The new tenant location element can thus be easily accessed and modified by the tenant server and can serve as a single source of truth for the payment system.

At 510, the locations platform 102 creates optimized tenant location data. The search service 116 can access the tenant-location element (e.g., via the multi-tenant location service 114) and convert it to a read-optimized data location element. For example, the search service 116 can compress and/or eliminate certain elements of the write-optimized location data 300 that are not needed when accessing location data for user requests.

At 512, the locations platform 102 associates the optimized tenant location data with one or more services, as well as with corresponding user experiences. In some embodiments, the search service 116 can communicate with the SDK 126 to register any new user experiences for faster access. In some embodiments, the search service 116 can communicate with the experience store 128 to establish a connection with any new user experiences for the new optimized tenant location data.

Figure 7:
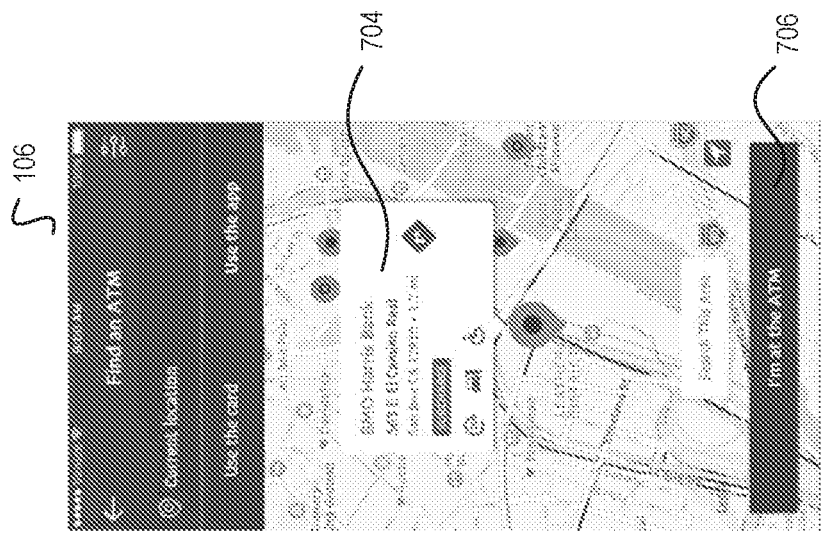
FIGS. 6 and 7 illustrate example UIs shown by a user device for various user experiences.
Figure 6:
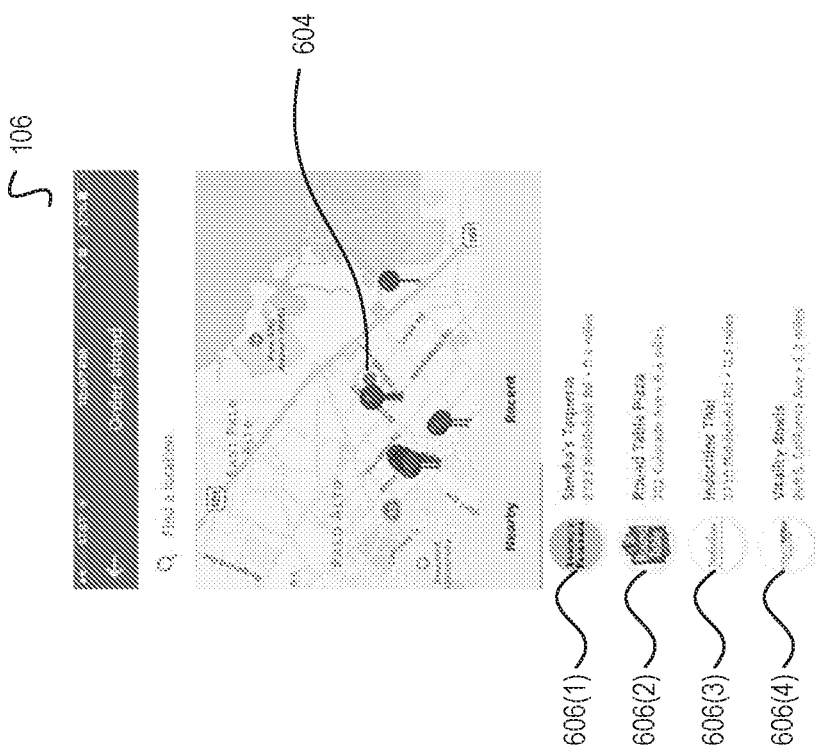

FIGS. 6 and 7 illustrate example UIs shown by a user device for various user experiences. As discussed above, the user experience is provided to the UI 106 for display via one of applications 130(1)-130(2) or the web browser 132. The user experience can be configured based on the user request, and the provided user experience, in turn, can reconfigure the applications 130(1)-130(2) or the web browser 132.

FIG. 6 illustrates an order-ahead user experience. In FIG. 6, the UI 106 displays several locations 606(1)-606(4), as well as the location 604 of the user device 104. The UI 106 can be displayed via an application 130(1). The order-ahead user experience may have been selected based on a user request provided by the user prior to the display shown in FIG. 6. Thus, the user experience shown in FIG. 6 is interactive, and further allows the user to select a specific tenant out of tenants indicated by locations 606(1)-606(4). Upon the further user selection, the locations platform 102 and/or the SDK 126 can reconfigure the user experience to match that of the selected tenant.

FIG. 7 illustrates a find an ATM user experience. In FIG. 7, the UI 106 displays a location 704, as well as an indication 706 of the location of the user device. The UI 106 can be displayed by reconfiguring the same application 130(1). The ATM user-experience may have been selected based on a user request provided by the user prior to the display shown in FIG. 7. Thus, the user experience shown in FIG. 7 is interactive, and further allows the user to select a specific ATM location and functionality. Upon the further user selection, the locations platform 102 and/or the SDK 126 can reconfigure the user experience to match that of the selected ATM and functionality.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 4 and 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 8:
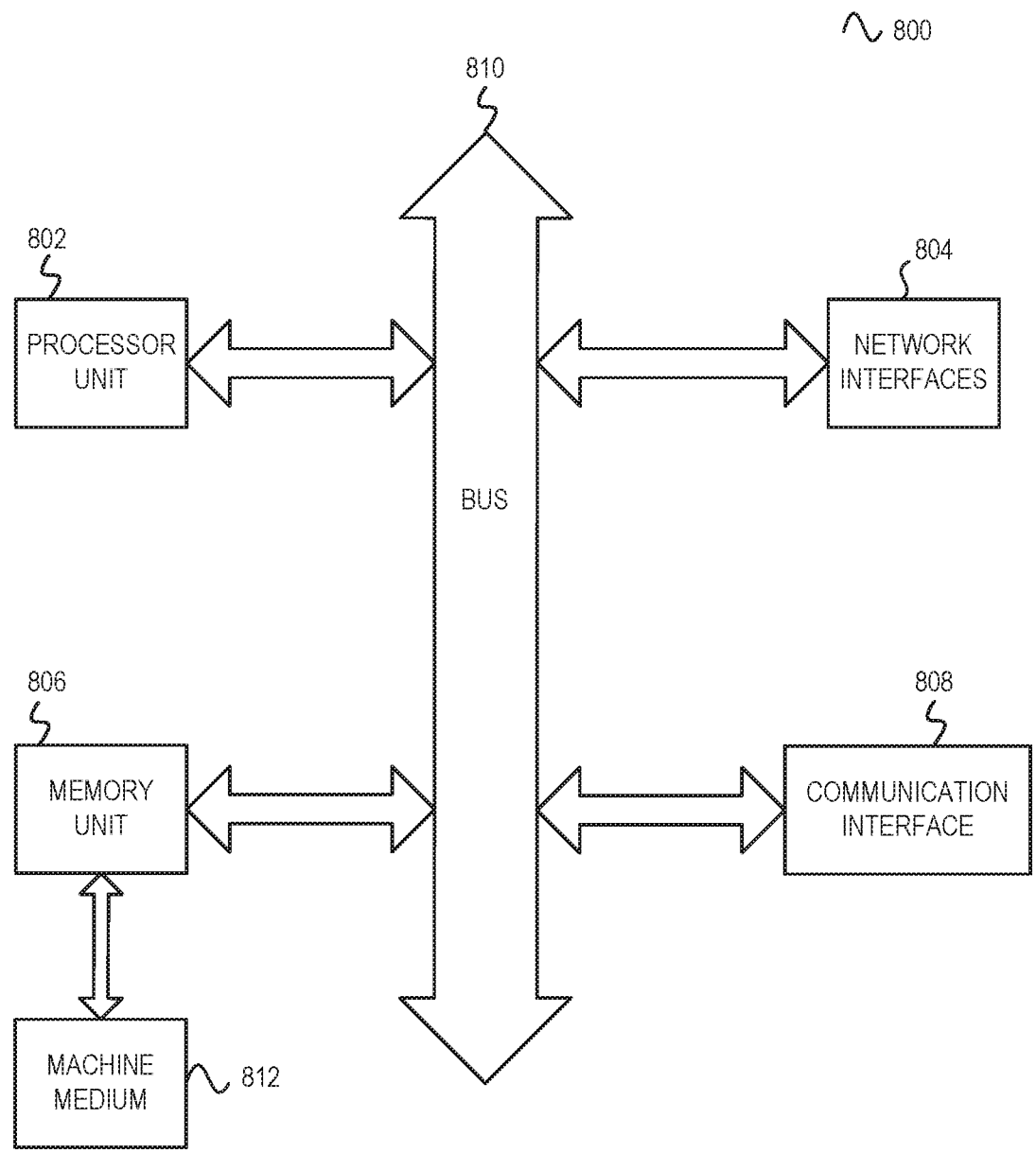
FIG. 8 is a block diagram illustrating embodiments of electronic devices used in the communication systems of FIGS. 1-7.

FIG. 8 is a block diagram of one embodiment of an electronic device 8 used in the communication systems of FIGS. 1-7. In some implementations, the electronic device 800 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 800 can include a processor unit 802 (possibly including multiple processors, multiple cores, multiple nodes, and/or implementing multi-threading, etc.). The electronic device 800 can also include memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 can also include a bus 810 (e.g., PCI, ISA, PCI-Express, HyperTransport®, InfiniBand®, NuBus, AHB, AXI, etc.), and network interfaces 804 can include wire-based interfaces (e.g., an Ethernet interface, a powerline communication interface, etc.). The electronic device 800 includes a communication interface 808 for network communications. The communication interface 808 can include at least one of a wireless network interface (e.g., a WLAN interface, a Bluetooth interface, a WiMAX interface, a ZigBee interface, a Wireless USB interface, etc.), In some implementations, the electronic device 800 may support multiple network interfaces—each of which is configured to couple the electronic device 800 to a different communication network.

The memory unit 806 can embody functionality to implement embodiments described in FIGS. 1-7 above. In one embodiment, the memory unit 806 can include one or more of functionalities that facilitate a locations platform for managing and providing of user experiences. Any one of these functionalities may be partially (or entirely) implemented in hardware and/or on the processor unit 802. For example, some functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, memory unit 806, the network interfaces 804, and the communication interface 808 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the present disclosure is not limited to them. In general, techniques for facilitate a locations platform for managing and providing of user experiences as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for managing a multi-tenant system for facilitating location-based services, the method comprising:
   providing location-based services to mobile devices, the providing of the location-based services comprising selecting a certain user experience for a certain tenant based on a geolocation of a mobile device of a user and providing the certain user experience to the mobile device for accessing, via a User Interface (UI) of the mobile device, a certain service of the certain tenant;
   receiving onboarding data for a new tenant onto the multi-tenant system, the onboarding data indicating one or more physical locations associated with the new tenant and one or more new services offered by the new tenant; and
   onboarding the onboarding data onto the multi-tenant system for a selection of a new user experience for the new tenant based on subsequent geolocation of the mobile device and for a provision of the new user experience to the mobile device for accessing, via the User Interface (UI), a new service of the new tenant.

2. The method of claim 1, wherein said onboarding the onboarding data comprises generating, based on the onboarding data, additional location data that indicates the new tenant and the one or more new services offered by the new tenant.

3. The method of claim 1, wherein the selection of the new user experience for the new tenant based on the subsequent geolocation of the mobile device comprises:
   receiving, at a server, a user request from the mobile device, the mobile device indicating a geographical location;
   selecting, based on the geographical location, the new tenant that offers one or more services that are available for access at the UI associated with a new service of the one or more services;
   selecting, based on the new tenant and the user request, the new user experience associated with the new service; and
   providing the new user experience to the mobile device, the new user experience for accessing, via the UI, the certain service of the new tenant.

4. The method of claim 1, wherein the geolocation corresponds to a destination location indicated by a mapping function of the mobile device; and
   the provision of the location-based services comprises determining the new tenant from one or more tenants available at the geolocation.

5. The method of claim 4, wherein said onboarding the onboarding data comprises generating a store reference for the new tenant based on one or more merchant store locations of the new tenant, the store reference usable for selecting the new tenant in response to subsequent user requests for transactions.

6. The method of claim 1, wherein the provision of the new user experience comprises providing an experience reference to the mobile device to configure a first application or a web browser for the certain service; and
   the mobile device hosts the first application or the web browser.

7. The method of claim 1, wherein said providing the new user experience comprises:
   providing a first user experience for displaying, on the UI, representations of two or more tenants available at the subsequent geolocation; and
   responsive to a selection, via a first of the representations, of a first tenant of the two or more tenants, reconfiguring the first user experience for displaying the certain service.

8. The method of claim 1, wherein said onboarding comprises storing service info including an experience reference for the new user experience including a geographical location, the experience reference useable for searching for the new user experience responsive to receiving user requests.

9. The method of claim 1, wherein said onboarding comprises:
   determining whether the new tenant is a new instance with a new location of the certain tenant; and based on determining that the new tenant is the new instance of the certain tenant, modifying data associated with the certain tenant to indicate the new location and the new user experience.

10. A multi-tenant system for facilitating access of user devices to location-based services, the multi-tenant system comprising:
a non-transitory memory storing instructions; and
one or more hardware processors coupled to the non-transitory memory and configured to execute instructions from the non-transitory memory to cause the multi-tenant system to perform operations comprising:
receiving onboarding data for a new tenant onto the multi-tenant system, the onboarding data indicating one or more physical locations associated with the new tenant and one or more new services offered by the new tenant, the multi-tenant system configured to provide certain user experience, to mobile device of a user, for a certain tenant of the multi-tenant system based on a geolocation of the mobile device;
determining whether the new tenant is a new instance with a new location of the certain tenant or a separate tenant that is different from the certain tenant;
based on determining that the new tenant is a separate tenant from the certain tenant, generating new data associated with the new tenant to indicate the new location and a new user experience for one of one or more new services offered by the new tenant; and
onboarding the onboarding data onto the multi-tenant system for selection of a new user experience for the new tenant based on subsequent geolocation of the mobile device and for a provision of the new user experience to the mobile device for accessing, via a User Interface (UI) of the mobile device, the one or more new services of the new tenant.

11. The multi-tenant system of claim 10, wherein the geolocation corresponds to a destination location indicated by a mapping function of the mobile device; and
the provision of the location-based services comprises determining the new tenant from one or more tenants available at the geolocation.

12. The multi-tenant system of claim 10, wherein said onboarding the onboarding data comprises generating a store reference for the new tenant based on one or more merchant store locations of the new tenant, the store reference usable for selecting the new tenant in response to subsequent user requests for transactions.

13. The multi-tenant system of claim 10, wherein the news user experience is provided by:
providing a first user experience for displaying, on the UI, representations of two or more tenants available at the subsequent geolocation; and
responsive to a selection, via a first of the representations, of a first tenant of the two or more tenants, reconfiguring the first user experience for displaying the new user experience.

14. The multi-tenant system of claim 10, wherein the operations further comprise:
providing location-based services to mobile devices, the providing of the location-based services comprising selecting a certain user experience for a certain tenant based on geolocation of the mobile device of the user and providing the certain user experience to the mobile device for accessing, via the UI of the mobile device, a certain service of the certain tenant.

15. The multi-tenant system of claim 14, wherein the provision of the new user experience comprises providing an experience reference to the mobile device to configure a first application or a web browser for the certain service; and
the mobile device hosts the first application or the web browser.

16. A non-transitory machine-readable medium having stored thereon machine-readable instructions which, when executed by one or more processors, cause a machine to perform operations comprising:
providing, by a multi-tenant system, location-based services to mobile devices, the providing of the location-based services comprising selecting a certain user experience for a certain tenant based on a geolocation of a mobile device of a user and providing the certain user experience to the mobile device for accessing, via a User Interface (UI) of the mobile device, a certain service of the certain tenant;
receiving onboarding data for a new tenant onto the multi-tenant system, the onboarding data indicating one or more physical locations associated with the new tenant and one or more new services offered by the new tenant; and
onboarding the onboarding data onto the multi-tenant system for selection of a new user experience for the new tenant based on subsequent geolocation of the mobile device and for a provision of the new user experience to the mobile device for accessing, via the User Interface (UI), a new service of the new tenant.

17. The non-transitory machine-readable medium of claim 16, wherein said onboarding comprises:
determining whether the new tenant is a new instance with a new location of the certain tenant; and
based on determining that the new tenant is the new instance of the certain tenant, modifying data associated with the certain tenant to indicate the new location and the new user experience.

18. The non-transitory machine-readable medium of claim 16, wherein the onboarding comprises:
determining whether the new tenant is a new instance with a new location of the certain tenant; and
responsive to determining that the new tenant is a separate tenant from the certain tenant, generating new data associated with the new tenant to indicate the new location and the new user experience.

19. The non-transitory machine-readable medium of claim 16, wherein the geolocation corresponds to a destination location indicated by a mapping function of the mobile device; and
the provision of the location-based services comprises determining the new tenant from one or more tenants available at the geolocation.

20. The non-transitory machine-readable medium of claim 16, wherein the provision of the new user experience comprises providing an experience reference to the mobile device to configure a first application or a web browser for the certain service; and
the mobile device hosts the first application or the web browser.

* * * * *